Figure 1:
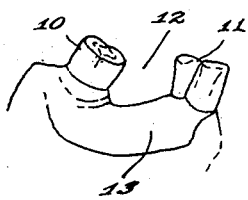

G. C. WITT.
REMOVABLE DENTAL BRIDGE.
APPLICATION FILED AUG. 4, 1919.

1,370,720.

Patented Mar. 8, 1921.
2 SHEETS—SHEET 1.

Witness
Frank A. Sahle

Inventor
George Chitwood Witt,
By Hood & Schley
Attorneys

G. C. WITT.
REMOVABLE DENTAL BRIDGE.
APPLICATION FILED AUG. 4, 1919.
1,370,720.
Patented Mar. 8, 1921.
2 SHEETS—SHEET 2.
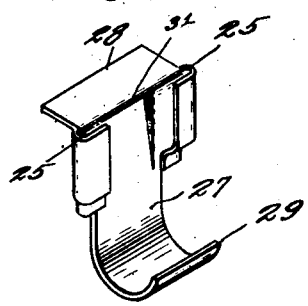
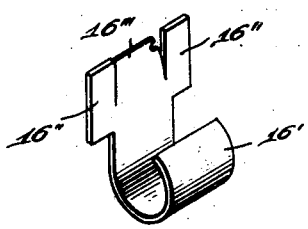
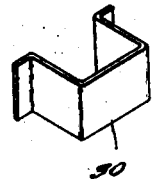
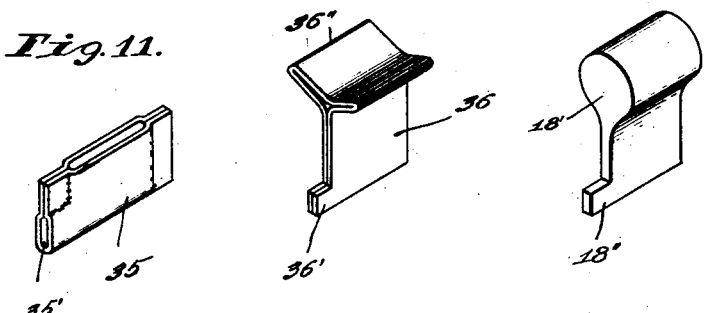
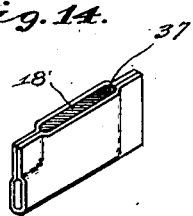
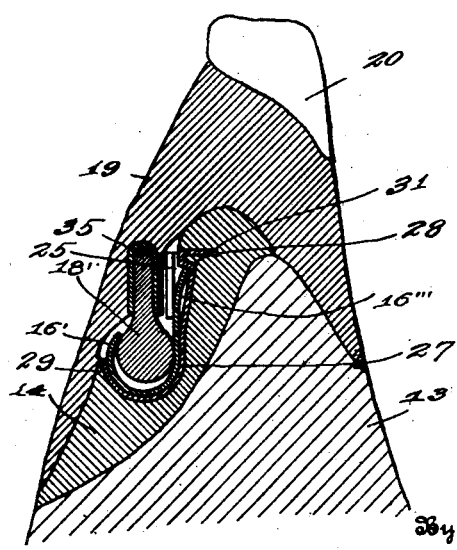
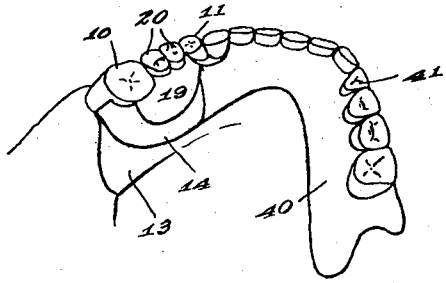
Inventor
George Chitwood Witt,
By Hood & Schley
Attorneys

UNITED STATES PATENT OFFICE.

GEORGE CHITWOOD WITT, OF INDIANAPOLIS, INDIANA.

REMOVABLE DENTAL BRIDGE.

1,370,720.	Specification of Letters Patent.	Patented Mar. 8, 1921.

Application filed August 4, 1919. Serial No. 315,126.

*To all whom it may concern:*

Be it known that I, GEORGE CHITWOOD WITT, a citizen of the United States, residing at Indianapolis, in the county of Marion and State of Indiana, have invented a new and useful Removable Dental Bridge, of which the following is a specification.

Where one or more teeth have been removed from the human mouth, it has long been customary to anchor a corresponding number of teeth by various means of attachment to the immediately flanking teeth. Many devices of this kind have been of such character that the artificial bridging teeth were permanently secured in place and consequently, because of practically unavoidable inaccuracies, become the lodging places for food, etc., to such an extent as to cause decay and infection.

Other means have been provided by which the artificial bridging teeth could be removed, more or less readily, but, so far as I am aware, those devices have generally been of such character that anchor members permanently connected to flanking teeth were required and these anchor members, of course, formed areas which could not be readily cleansed to avoid infection. In devices of that character, where the bridging teeth were removable occlusally, difficulty has been experienced, not only by reason of the infection area due to the permanent anchorages, but also because of the difficulty of obtaining and maintaining a satisfactory seat for the bridge which will support the bridge against lateral stresses and which will not pain the wearer. In that type of structures in which the bridge member is removed laterally, either labio-lingually or bucco-lingually, difficulty has been experienced in obtaining a satisfactory anchorage as well as on account of infection area of the permanent anchorages. In many of these types it is essential to do a considerable amount of work upon, and in many cases radically modify, the flanking natural teeth and where the removable bridge structure is to be withdrawn occlusally, it is essential that all overhang of the natural teeth be ground away. This is especially objectionable where there has been a gap for a considerable period and the flanking teeth have become distorted toward each other, so as to have a decided overhang in the gap.

The object of my present invention is to produce a readily-removable artificial denture, of such character that it may be readily and accurately produced by an average operator; that no material modification of the flanking natural teeth is necessary or desirable; that a firm and extended seat may be obtained upon the gums to support the biting stresses; that the structure may be firmly anchored between the natural teeth so as to resist all normal stresses; and that the entire structure may be removed so that the gap and flanking natural teeth may be regularly thoroughly and easily cleaned.

Figure 4:
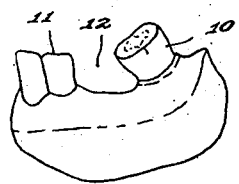
Figure 2:
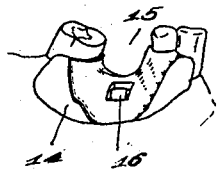
Figure 5:
Figure 3:
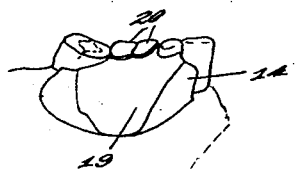
Figure 6:
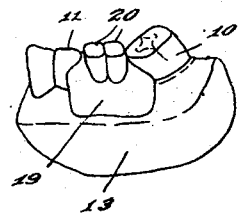
Figure 7:
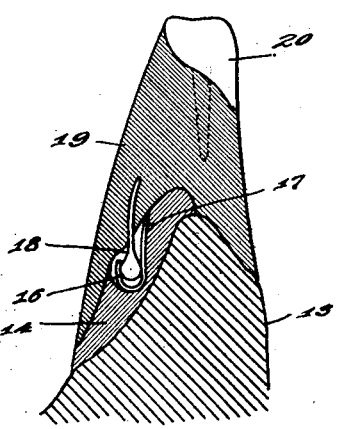

The accompanying drawings illustrate my invention. Figure 1 is a fragmentary perspective of a portion of the human jaw, showing flanking natural teeth and an intermediate gap, the view being outwardly toward the cheek; Fig. 2 a similar view, showing the anchor member in place; Fig. 3 a similar view, showing the anchor member and teeth-carrying bridge member in place; Fig. 4 a view similar to Fig. 1, looking inwardly toward the tongue; Fig. 5 a view similar to Fig. 2, but looking inwardly toward the tongue; Fig. 6 a view similar to Fig. 3, looking inwardly toward the tongue; Fig. 7 a vertical section; Fig. 8 a perspective view, on an enlarged scale, of a modified portion of the anchor member; Fig. 9 a similar view of the spring-seat of the member shown in Fig. 8; Fig. 10 a similar view of a temporary member to aid in the investment of the part shown in Fig. 8; Figs. 11, 13 and 14 similar views of portions of the saddle member shown in Fig. 15; Fig. 12 a similar view of a temporary member to aid in the investment of the part shown in Fig. 11; Fig. 15 a vertical section of the complete plate shown in Fig. 16; and Fig. 16 a perspective of a partial upper plate embodying my invention.

In Figs. 1–7 of the drawings, 10 and 11 indicate the flanking natural teeth, 12 the intermediate gap, and 13 the gum adjacent the gap.

In order to produce my device, the operator, having first thoroughly cleansed the flanking teeth 10 and 11 and properly prepared the gum adjacent the gap, will, in a well-known manner, produce a plaster replica of the flanking teeth, the gap and adjacent gum. The manner of production of this plaster replica is well known in the art and needs no detailed description. The operator then produces a wax pattern for the anchor member 14, extending over the gum, preferably on the inner side. This pattern will not only be pressed firmly down against the gum, but also be against the flanking teeth to at least the height of their cross width and also will be pressed into the gap 12 and against the adjacent faces of the flanking teeth up to a sufficient height to produce a crotch 15 which, in conjunction with the exposed portions of the adjacent faces of the flanking teeth, will be a flaring one, having no intermediate dimension exceeding the shortest distance between the adjacent faces of the flanking teeth. This wax or pattern will extend laterally between the flanking teeth to a sufficient distance to obtain adequate anchorage along the jaw line, but not far enough to prevent withdrawal of the pattern lingually. If the operator desires to have this member withdrawn outwardly, of course, the above operation will be reversed, but as a general rule I believe it to be better to form the anchor member for withdrawal lingually. At the time the wax pattern for this anchor member is being formed, I embed in the wax, in the lingual surface, a spring clip 16 which, for the purpose of anchorage, is conveniently provided with a transversely extending wire or projection 17 which will become thoroughly embedded in the casting which is to be produced. I then mount in the spring clip 16 a filler or carrier which will project from the clip. Thereupon, the pattern and projecting filler are invested in the usual manner and, after investment, the wax pattern is melted out and a casting 14 produced in a well-known manner. This casting, which forms the anchor member of my structure, will fit accurately in the gap 12 between the flanking teeth 10 and 11 and upon the adjacent gum 13, preferably upon the lingual side. It is carefully finished, as indicated in Fig. 2, and thereupon the operator, having first placed pin 18 in the clip 16 and supported the same so it will not bottom in the clip, as shown in Fig. 7, will produce a wax pattern for the tooth-carrying member 19, this pattern being produced in the manner previously described and completely filling the gap between the teeth 10 and 11 on top of the anchor member 14. This tooth-carrying member is a saddle-shaped member, which will straddle the anchor member 14 with one leg resting upon the anchor member and the other leg resting upon the outer surface of the gum. Embedded in the pattern by any suitable anchorage, will be the necessary artificial teeth 20 and also the pin 18. Thereupon, a casting is produced so as to form the teeth-carrying saddle member 19. This member may then be placed in position in the gap 12 and upon the anchor member 14 by an occlusal movement, either in a straight line or along a curved line, depending upon the shape of the gap and the flanking teeth. As it moves into place, the enlarged head of the locking pin 18 slips into the spring clip 16 and is lightly held thereby with sufficient force to prevent accidental displacement. The saddle 19 accurately fits between the flanking teeth, both in the line of the jaw and transversely and will, of course, have a bearing so extended that it will be thoroughly anchored laterally, receiving the full resisting strength of the flanking teeth as well as the resistance of the anchor member 14 with its extended bearing upon the gum.

The anchor member 14 may be extended as far as may be desired along the gum so that chewing pressures exerted upon the artificial teeth may be transferred to a very extended area on the gum, not only in the gap between the teeth, but also along the gum beside the flanking teeth. As a consequence, there can never be any concentric pressures upon the gum, tending to irritatation and distress.

The grip of the spring clip 16 upon the saddle member needs only to be very light and this may be readily overcome, when removal is desired, by a slight counter-occlusal pull exerted by the wearer. The saddle member when formed as described, will be removed in a counter-occlusal direction, whereupon, the anchor member may be removed, or will drop out transversely. The parts may thus be thoroughly cleansed and the gap between the teeth, as well as the flanking teeth, may also be thoroughly cleansed.

It is apparent that many modifications in the precise forms of the parts, depending upon specific conditions, will be well within my invention. For instance, it will be apparent that the anchor member may, as previously stated, be formed for outward removal instead of lingually: that the line of movement of the saddle member need not necessarily be occlusal, etc., but so far as I have been able to discover at the present time, it is my opinion that the best results are to be obtained by a lingually-removable anchor member and an occlusally-removable saddle member of the character disclosed.

It will also be apparent that my improved device may be used in conjunction with a partial plate carrying several teeth. I illustrate such a construction in Fig. 16.

In Figs. 8-16, I have used, as far as possible the same reference numerals to indicate parts corresponding to those found in Figs. 1-7, and those parts will need no further description.

I have found in practice that considerable skill is required to properly embed parts 16 and 18 (Fig. 7) in the wax pattern and for that reason I have designed the parts shown in Figs. 8-14 to facilitate the technique of the utilization of my invention. To take the place of the spring clip 16, I provide the spring clip 16' having an anchor end 16'' and spring retainer lip 16'''. The parts 16'' fit in pockets 25 of a holder 27 having an anchor end 28 (adapted to be cast in anchor member 14) and a guard end 29 (adapted to guard, to some extent, the spring 16').

In operation, the wax pattern for anchor member 14 is produced as previously described and holder 27 is embedded therein at the proper place. The U-shaped filler 30 is then placed in pockets 25 so as to keep them held firmly open during investment and casting. The parts are then invested in the usual manner and the casting produced as already described. Thereupon, filler 30 is removed and spring clip 16' substituted, the retaining lip 16''' springing in under a shoulder 31 so as to retain the clip in place against all ordinary displacement, although permitting removal by proper tools if need be.

In the same general way, the pocket 35 is embedded in the wax pattern for the saddle member 19, a filler 36 being placed in the pocket to hold firmly during investing and casting and keep it clear of investment material. Filler 36 is provided with a toe 36' adapted to interlock with a corresponding depression 35' in pocket 35 and is temporarily held in place by a pin 37. Filler 36 is conveniently formed with anchor wings 36'' which become embedded in the investiture. After casting, the filler 36 is removed and the pin 18' (corresponding to pin 18, Fig. 7) is placed in position by slipping its shank into pocket 35, moving its toe 18'' into depression 35', and locking it in place by pin 37.

As shown in Fig. 16, the anchor member 14 may be embodied in, or made to form a part of, an extended dental plate 40 of ordinary form and carrying many teeth 41, thereby serving, when locked in place by saddle 19, to firmly, though readily removably, hold the dental plate in place.

So far as I now am informed, I believe that the parts 14 and 19 may most probably be aluminum and, as the parts 18 and 16 (16') should preferably be of gold, the parts 27 and 35 become important because they may be made of a cheaper material, not injuriously affected by the metal of 14 and 19 when the castings are being made, said members forming proper seats or holders for parts 16' and 18 after the castings are finished. It will be apparent that, by this arrangement, the parts 16' and 18 may be readily withdrawn for replacement or repair. It will also be apparent that this combination of a denture (as body 14 or 19), a fixed anchor member (as piece 27 or 35) permanently secured to the denture, and a removable anchor (as piece 16' or 18) re- movably attached to the fixed anchor, may be embodied in many denture-forms. I use the broad term "denture" to indicate any member, either natural or artificial, which is tooth-carrying.

I claim as my invention:

1. An artificial denture comprising a transversely removable anchor member fitted between gap flanking teeth and resting upon the adjacent gum, and a tooth-carrying saddle member lying removably in the gap between the flanking teeth and resting upon the anchor member.

2. An artificial denture comprising a transversely removable anchor member fitted between gap flanking teeth and resting upon the adjacent gum, and a tooth-carrying saddle member lying removably in the gap between the flanking teeth and resting upon the anchor member, said anchor member and saddle member carrying interlocking portions.

3. An artificial denture comprising a transversely removable anchor member having a portion lying between gap flanking teeth and a portion resting upon the adjacent gum, and an occlusally removable saddle member lying in the gap between flanking teeth with one leg resting upon the anchor member and the other leg resting upon the gum in lateral opposition to the anchor member.

4. An artificial denture comprising a transversely removable anchor member having a portion lying between gap flanking teeth and a portion resting upon the adjacent gum, and an occlusally removable saddle member lying in the gap between flanking teeth with one leg resting upon the anchor member and the other leg resting upon the gum in lateral opposition to the anchor member, said anchor member and saddle member carrying interlocking portions.

5. An artificial denture comprising an anchor member having a portion lying between and engaging gap flanking teeth and a portion lying upon the lingual surface of the gum adjacent the gap and flanking teeth, said anchor member being lingually removable, and an occlusally-removable saddle member lying between and engaging the gap-flanking teeth and having one leg resting upon the anchor member and the other leg resting upon the buccal gum surface adjacent the gap in opposition to the saddle member.

6. An artificial denture comprising an anchor member having a portion lying between and engaging gap flanking teeth and a portion lying upon the lingual surface of the gum adjacent the gap and flanking teeth, said anchor member being lingually removable, and an occlusally-removable saddle member lying between the gap-flanking teeth and having one leg resting upon the anchor member and the other leg resting upon the buccal gum surface adjacent the gap in opposition to the saddle member.

7. An artificial denture comprising an anchor member having a portion lying between and engaging gap flanking teeth and a portion lying upon the lingual surface of the gum adjacent the gap and flanking teeth, said anchor member being lingually removable, and an occlusally-removable saddle member lying between the gap-flanking teeth and having one leg resting upon the anchor member and the other leg resting upon the buccal gum surface adjacent the gap in opposition to the saddle member, said anchor member and saddle member carrying interlocking portions.

8. An artificial denture, comprising an artificial main tooth-carrying body adapted to be retained in the mouth and having a portion adjacent and bridging the space between two separated teeth anchored in the jaw, and a saddle member coöperatively associated with said main body and anchored teeth, said saddle member having an overlapping detachable connection with the main body and carrying an artificial tooth lying in the gap between the permanently anchored teeth.

In witness whereof, I have hereunto set my hand at Indianapolis, Indiana, this thirty-first day of July, A. D. one thousand nine hundred and nineteen.

GEORGE CHITWOOD WITT.